United States Patent [19]

Pfisterer

[11] Patent Number: 4,629,233
[45] Date of Patent: Dec. 16, 1986

[54] MATERIAL COMPACTING DEVICE

[75] Inventor: Dieter Pfisterer, Wyckoff, N.J.

[73] Assignee: Pfisterer Environ, Inc., Wayne, N.J.

[21] Appl. No.: 754,968

[22] Filed: Jul. 15, 1985

[51] Int. Cl.⁴ .......................... A01B 1/02; B65D 67/12
[52] U.S. Cl. ........................................ 294/1.1; 294/55
[58] Field of Search ................ 294/55, 1.1, 19.1, 93, 294/97, 99.1; 248/95, 97, 99, 100, 101; 15/104.8, 257.1, 257.3, 257.4, 257.5, 257.7, 257.8; 383/34, 33, 117

[56] References Cited

U.S. PATENT DOCUMENTS

| | | | |
|---|---|---|---|
| 2,908,123 | 10/1959 | Muller et al. | 53/29 |
| 3,290,841 | 12/1966 | Sartore | 53/258 |
| 3,380,220 | 4/1968 | Jennings et al. | 53/24 |
| 3,662,514 | 5/1972 | Goss | 53/37 |
| 3,697,030 | 10/1972 | Schultz | 15/257.1 |
| 3,733,099 | 5/1973 | Szita | 294/55 |
| 3,935,692 | 2/1976 | Miller | 53 B/126 |
| 3,936,087 | 2/1976 | Alexander | 294/1.1 |
| 3,979,146 | 9/1976 | Berg | 294/55 |
| 4,003,100 | 1/1977 | Whitaker | 294/19.1 |
| 4,014,157 | 3/1977 | Pearce | 294/1.1 |
| 4,023,238 | 5/1977 | Phares | 17/41 |
| 4,044,525 | 8/1977 | Forsgren | 53/24 |
| 4,193,157 | 3/1980 | Large | 15/257.1 |
| 4,268,081 | 5/1981 | Hawkinson | 294/55 |
| 4,312,531 | 1/1982 | Cross | 294/55 |
| 4,318,521 | 3/1982 | Martin et al. | 15/257.1 |
| 4,378,670 | 4/1983 | Check et al. | 294/55 |
| 4,480,426 | 11/1984 | Wach et al. | 53/576 |

Primary Examiner—James B. Marbert
Attorney, Agent, or Firm—Ronald G. Goebel

[57] ABSTRACT

A device for compacting the containerizing compactible material such as leaves, grass and trash is provided. The device consists of a directing element having a front funnel section and a rear conduit, a rake and plunger element which is used to introduce material into the funnel section and force such material through the conduit; and a tubular netted bag having an open end mounted over the rear conduit. As material is pushed into the bag air is displaced ahead of and out the spaces in the netting material. The device can be assembled on legs to be used in an upright position and can be easily stored on a wall.

8 Claims, 8 Drawing Figures

MATERIAL COMPACTING DEVICE

BACKGROUND OF THE INVENTION

This invention deals with a device for compacting and containerizing compactible material such as leaves and grass.

In the past leaves, cut grass and other yard materials have been collected and disposed of by raking and bagging these materials in plastic bags. Generally the procedure consists of raking the material into a pile and then stuffing the piled leaves into plastic trash bags either by hand or with the rake or both. The leaves, for example being light weight and somewhat resilient are not actually compacted using this method. A great deal of air is trapped between the leaves such that the amount of leaves in each bag is significantly less than what theoretically could be packed therein. This dictates that many bags must be used to pack a relatively small volume of leaves.

The bagging procedure is also slow since only a small quantity of leaves is insertable in the open trash bags at one time and the bag does not allow entrapped air to escape. Moreover, it is often the case that many leaves do not enter the bag because there may be too many for introduction or some leaves may become caught by the wind and blow away. Raking and bagging is also tedious involving much bending and arm movement. Finally, leaves and other organic materials contained in the plastic bags are not rendered biodegradable which presents significant problems to the manicipality of other government entity charged with the disposal of such materials.

The present invention, on the other hand, permits the compaction and containerization of leaves, grass and other compactible materials with significantly more speed, and less tedium than using the prior raking and bagging procedure and at appreciable materials savings. Material is introduced to the container and displaces air therefrom and in so doing the material is compacted so that the volume of accumulated material approaches its actual volume. Moreover, the contained leaves are maintained in contact with the environment rendering them biodegradable and therefore more easily disposed of by the appropriate government entity.

SUMMARY OF THE INVENTION

Briefly, the invention comprises a device for compacting and containerizing compactible material such as leaves and grass. The device comprises a material directing element which is a hollow conduit having a front funnel section which converges to a rear tubular section. The directing element has a handle to enable carrying and means for anchoring it to the ground. It also has leg attachment elements which are used to mount the directing element to legs so that it can also be used in the upright position. A rake and plunger element is used to accumulate and push material such as leaves into the directing element. The rake and plunger element has a curved handle to alleviate bending by the user and a toothed rake member attached thereto made of a hard but flexible or resilient material.

For use in raking leaves, for example, the directing element is anchored to the ground by suitable anchoring means and a length of a plastic tubular netting is mounted over a rim on the rear section of the directing element. A means for creating resistance on the netting as well as to prevent unraveling of the netting such as an elastic band is placed around the rear section forwardly of the rim. The netting is tied at its far end to create a bag. The rake and plunger element is used to rake leaves into a mass and then push the mass into the funnel section and through the rear section into the netted bag which unravels as more and more leaves are pushed into the bag. As this is done air is displaced ahead of the leaves and out the spaces in the netting. The process is repeated pushing leaves under compacting force with the rake and plunger element until a desired length has been reached or until the bag is full. The open end of the bag is then removed from the rear section, tied and cut forwardly of the tie so that the filled bag is sealed at both ends. The cut end is tied and pulled rearwardly of the rear section of the directing element to form another bag for storing compacted leaves.

The device, when mounted on legs in the upright mode can serve as a compacting device for compactible waste storable in a garage or other area.

DETAILED DESCRIPTION OF THE PREFERRED EMBODIMENTS

Figure 1:
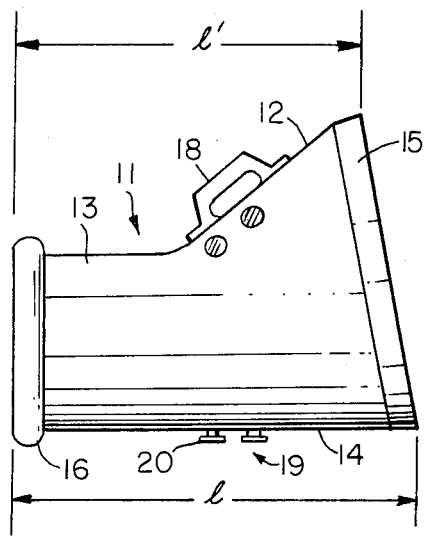
FIG. 1 is a side view of a leaf directing element of the invention.
Figure 2:
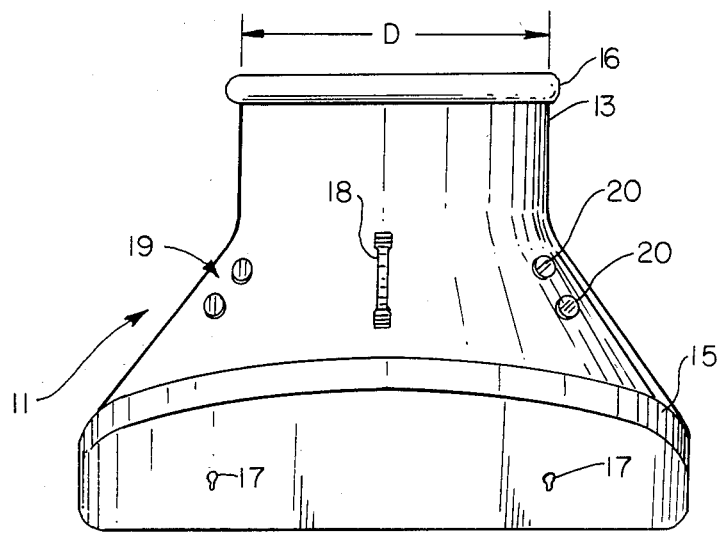
FIG. 2 is a top view of the leaf directing element of FIG. 1.
Figure 3:
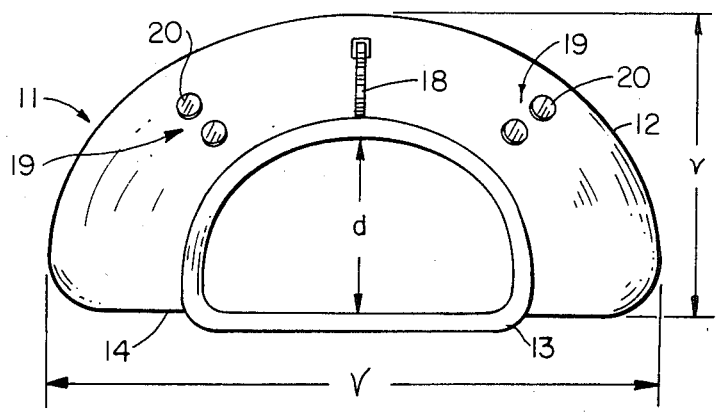
FIG. 3 is an end view of the leaf directing element.

Referring to the drawings and especially FIGS. 1, 2 and 3, there is shown a leaf directing element indicated generally by 11. The leaf directing element is a hollow conduit comprised of a front funnel section 12 which converges to a rear section 13. The bottom 14 of the leaf directing element is flat so that the element can rest firmly on the ground or other horizontal surface. The front of the front funnel section is slightly angled from the vertical and is equipped with a rim portion 15 which converges slightly inwardly with respect to the outwardly flaring contour of the funnel 12. The rear section 13 has an expanded annular ring 16 which permits tubular netting material to be pulled thereover and retained as will be discussed in more detail in connection with FIG. 7. As shown in FIG. 3 a cross-section of both the funnel section 12 and rear section 13 shows each to be in the shape of a hemi-ellipse. Located at the bottom 14 of the funnel section are slotted anchor holes 17. A carrying handle 18 is also mounted on the top of funnel section 12. Located on one side of the top of funnel section 12 are leg attachment elements 19 consisting of a pair of T-shaped legs 20 which fit into slots on legs 41 which will be discussed in connection with FIG. 8. Such leg attachment elements 19 are also located on the opposite side of the top of the funnel section and one the bottom 14 of such section (see FIG. 1).

Preferably, the dimensions of the directing element are as follows. Lower length 1 is 21″. Upper length 1′ measured from the rim 16 of the rear section 13 to the rim 15 of the front funnel section 12 is 14″. The vertical diameter d of the rear section is 8" and the horizontal diameter D is 16". The vertical diameter v of the front funnel section 12 of the rim 15 is 14" and the horizontal diameter V at the rim is 30".

Figure 4:
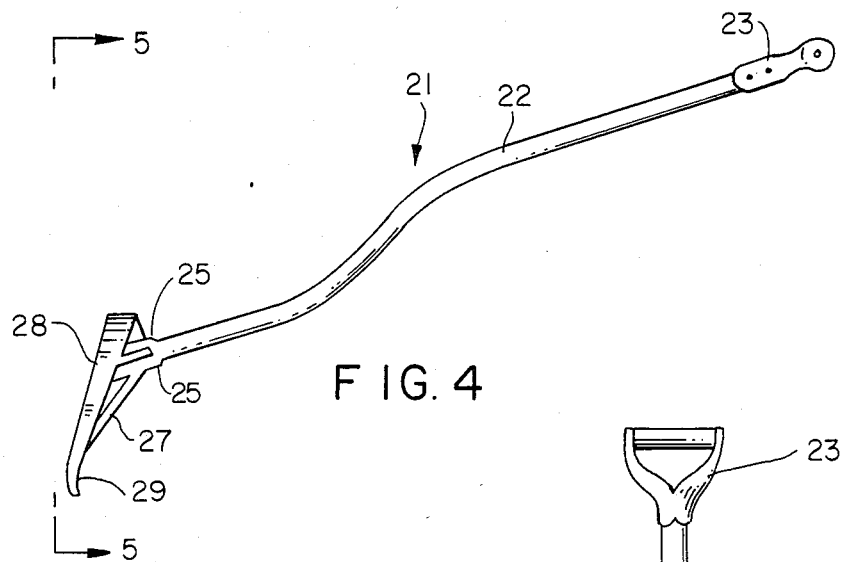
FIG. 4 is a side view of a rake and plunger element of the invention.
Figure 6:
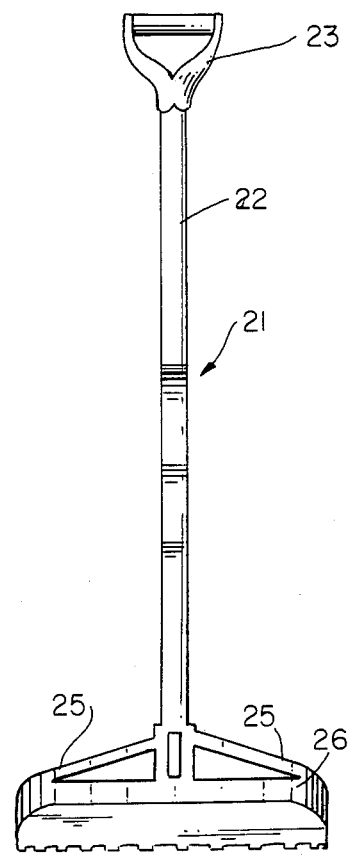
FIG. 6 is a top view of the rake and plunger element.
Figure 5:
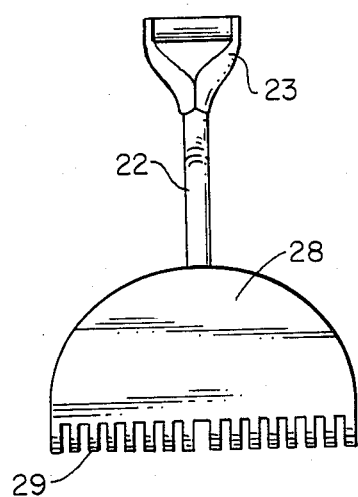
FIG. 5 is a view of said rake and plunger element along line 5—5 of FIG. 4.

Referring now to FIGS. 4, 5 and 6 there is shown generally a rake and plunger element 21 used to accumulate and compact leaves into and through the leaf directing element 11. The rake and plunger element consists of a handle 22 curved as shown in FIG. 4 to prevent bending of the user while in use. A hand grip 23 is mounted at one end of the handle by screwing or nailing. At the other end of the handle is a rake support assembly 24 consisting of angle supports 25 extending outwardly of the handle 22. The transverse support 26 extends between the termini of the angle supports 25. Lower support 25 extends downwardly from the handle 22. Mounted on the support assembly by bolts is rake member 28 made of a hard but flexible material such as rubber or plastic. The rake member has a plurality of teeth 29 which assist in picking up leaves and grass. The rake and plunger element should be about 65". The rake member should be about 15" wide and about 7" high.

Figure 7:
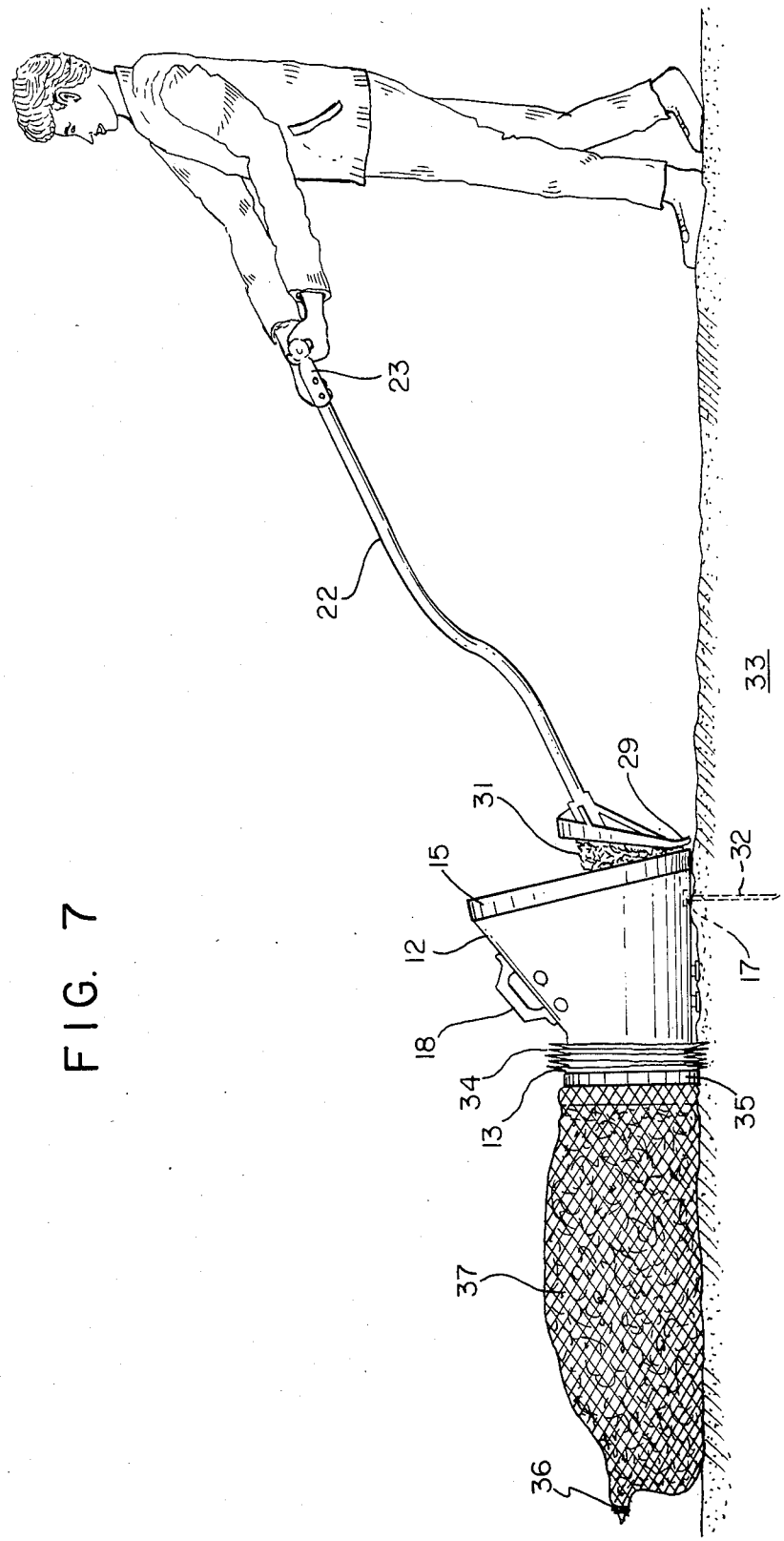
FIG. 7 shows the operation of the device of the invention.

Refering to FIG. 7 use of the invention is shown. The rake and plunger element 21 is used to gather up leaves and/or grass 31. The user, when a substantial pile has been accumulated, pushes or rakes the leaves to the front of the front funnel section 12. The leaf directing member 11 is anchored to the ground 33 via anchor rods 32 which are passed through holes 17 in the front funnel section. A length of tubular plastic netting 34 is bunched up over rear section 13. Such netting is available in rolls containing several thousand feet of material in which the netting measures 14" in diameter and has openings measuring about 1"×1". One such netting material comprised of polyethylene is sold by The Bemis Company of St. Louis, MO.

In order to create a resistance to compaction and to prevent the netting material 34 from unraveling too much as leaves are pushed through the netting, an elastic band 35 is mounted over the netting adjacent the rim 16 of the rear section 13. The netting at its other end is knotted or tied by any suitable means such as a metal tie 36 to create a bag 37. The leaves are fed into the funnel section by the rake and plunger, pressed through the rear section and into the bag 37 towards the tie 36. As this is done air ahead of the leaves passes out the spaces in the netting material. In addition, the netting fitted over the rear section expands outwardly somewhat as it is pushed off the rear section 13 in response to the compaction force of the rake and plunger element. As a result, leaves which are under a compaction pressure in the rear section, enter the expanded netted bag as they exit the rear section under a reduced compaction pressure which prevents them from backing up into the rear section again. The process is continued until a bag of compressed leaves of desired length is obtained suitable for disposal. At that point a small portion of netting is slid off the rear section and tied to form a bag closed at both ends. The netting is then cut forwardly of the tie and retied. A length of netting is then pulled from the rear section 13 as shown in FIG. 7. It has been found that in comparative tests to the former method of removing leaves by raking and transferring the leaves to plastic trash bags for disposal that the results were starting. For example in an area containing a surplus of leaves distributed throughout it took eighteen (18) minutes to rake and bag ten (10) bags of leaves in polyethylene bags. In the same area using the device of the invention it was possible to rake and compact the equivalent number of bags of leaves into thirteen (13) feet of netted bag and it took only three (3) minutes. This amounts to a savings in time of fifteen (15) minutes or eighty-three percent (83%) relative to raking and bagging. Further, the ten (10) empty polyethylene bags weighed approximately one (1) pound. The netting used in the invention weight about 2 oz. or $\frac{1}{8}$ lb. Thus there was a material savings of 87.5% using the present invention. The rear section 13 can be equipped with approximtely one hundred feet of tubular netting for example, which allows for continuous operation until the device needs to be reloaded or re-equipped.

There are several advantages obtained using the device of the invention over the prior raking and bagging procedure. Firstly, there is speed as demonstrated above. The savings in time using the present device are enormous compared to raking and bagging. Secondly, there is a marked savings in space using the device due to the ability to efficiently compact leaves and displace air using the device. With prior raking and bagging no push compaction is permitted and air is retained between the leaves. What this means to the user is that the space requirement of bags can be reduced by about 50%. Thirdly, there is savings of effort. Using the rake and plunger of the invention with its arched design there is less bending as in the case with the prior raking and bagging. The handle 18 also makes the device easily movable from one point to another. Fourthly, the leaves and other organic materials such as grass contained in the plastic netting are in contact with the environment which cannot be said of leaves bagged in plastic bags as currently used. This permits the leaves and organic materials to biodegrade which assists the entity having responsibility for their efficient disposal.

Figure 8:
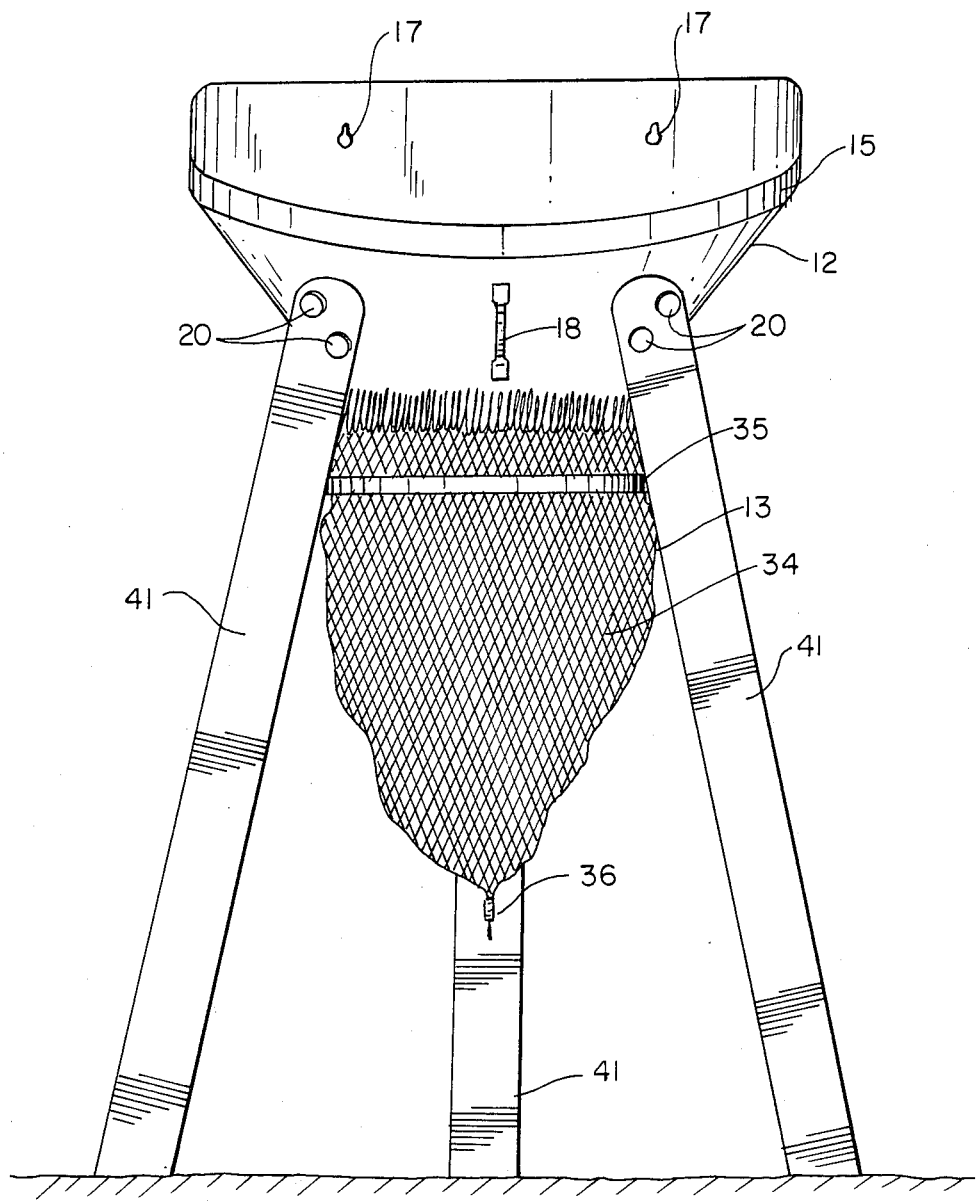
FIG. 8 shows the device in the stand-up mode.

FIG. 8 shows the device of the invention in an upstanding mode. In this condition the leg attachment elements 19, that is, T-shaped legs 20, fit into slots (not shown) in leg 41. The netting 34, band 35 and tie are used as shown in FIG. 7. This configuration allows material such as leaves and grass to be introduced into the bag from above through the funnel member 12 and is ideal for storage in a garage for example where it can serve as a general receptacle for compactible material. The rake and plunger acts as a compactor for the material as hereinbefore discussed. The directing element and rake and plunger element can also be conveniently hung on a wall for storage by their respective handles.

The device of the invention is not limited to the containerization of leaves, grass or other organic material. Any compactible material may be compacted in the netted bags including paper and trash for example. The netted bags of compactible material may also be retained for other purposes including but not limited to the protection of plant life from freezing by surrounding the plant life with the netted bags, the prevention of soil erosion by placing the netted bags on the soil and temporary recreational use by making play houses, barricades, forts with a plurality of netted bags.

What is claimed is:
1. A device for compacting and containing compactible material comprising:
 (a) a directing element having a front funnel which converges into a rear conduit;
 (b) a rake and plunger element having a handle and a rake member attached thereto for raking compactible material and plunging said material through said conduit;

(c) a netted material for containing said compactible material having a closed end and having an open end bunched over said rear conduit; and (d) means for creating a resistance to compaction of said netted material on said conduit;

whereby compactible material forced through said rear conduit is introduced into said netted material and said bunched netted material feeds out from said conduit in response to the compaction force of the rake and plunger element against said compactible material until a netted container of compactible material of desired length is obtained.

2. The device of claim 1 which further comprises a handle.

3. The device of claim 1 which further comprises means for anchoring said directing element to the ground.

4. The device of claim 1 wherein said compactible material is leaves, grass and mixtures thereof.

5. A method for compacting and containing compactible material in a netted material comprising:

(a) providing a directing element having a front funnel section which converges into a rear conduit, said rear conduit having bunched thereover the open end of a netted material having a closed end and means for creating a resistance to compaction of said netted material on said conduit;

(b) gathering a quantity of compactible material with a rake and plunger element having a handle and rake member attached thereto;

(c) introducing said compactible material into said funnel section with said rake and plunger element and plunging said leaves through said rear conduit into said netted material, said netted material feeding off said conduit in response to the compaction force of the rake and plunger element against said compactible material until a netted container of compactible material of desired length is obtained;

(d) removing said netted material from said rear conduit; and (e) securing said open end of said netted material to form a closed container of netted material.

6. The method of claim 5 which further comprises repeating steps a to c.

7. The closed container of netted material produced by the process of claim 5.

8. The closed container of netted material produced by the process of claim 6.

* * * * *